Sept. 16, 1952  J. D. ROTH ET AL  2,610,561
HILLING ATTACHMENT FOR ROTARY TILLING MACHINES
Filed Nov. 16, 1948  2 SHEETS—SHEET 1

John D. Roth
Kenneth D. Roth
INVENTORS.

Sept. 16, 1952   J. D. ROTH ET AL   2,610,561
HILLING ATTACHMENT FOR ROTARY TILLING MACHINES
Filed Nov. 16, 1948   2 SHEETS—SHEET 2

John D. Roth
Kenneth D. Roth
INVENTORS.

Patented Sept. 16, 1952

2,610,561

UNITED STATES PATENT OFFICE 2,610,561

HILLING ATTACHMENT FOR ROTARY TILLING MACHINES

John D. Roth and Kenneth D. Roth, Stowe, Pa.

Application November 16, 1948, Serial No. 60,242

1 Claim. (Cl. 97—48)

The present invention relates to new and useful improvements in hilling attachments for rotary tilling machines and more particularly to an attachment of this character for use with motor operated tilling machines of the walking type.

An important object of the invention is to provide a hilling plow mounted on the machine forwardly of the rotary tiller so that it hills the soil about the plants before the tiller pulverizes the soil to level out the furrow caused by the hiller and thus eliminating the forming of channels in the soil that would readily wash in a heavy rain.

A further object of the invention is to provide a vertically swingable plow beam for the hilling plow with novel means for easily and quickly raising and lowering the plow to position the same in its active or inactive position.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
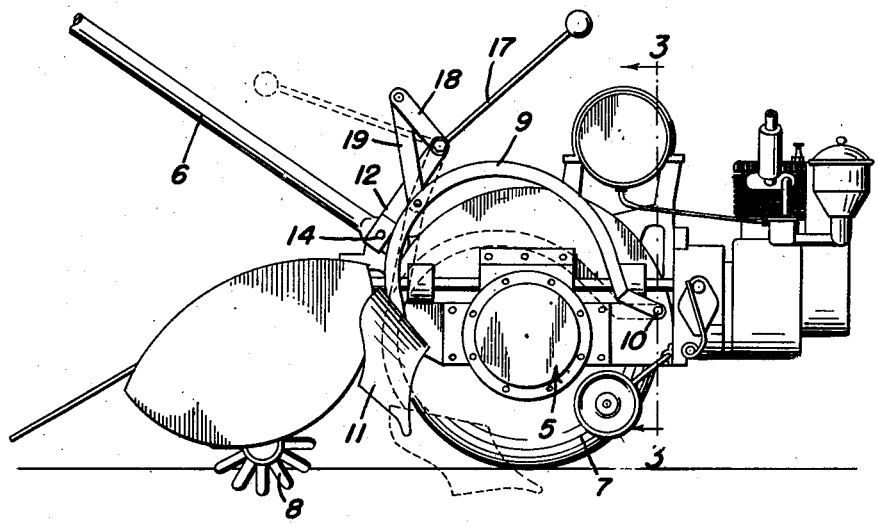
Figure 1 is a side elevational view.
Figure 2:
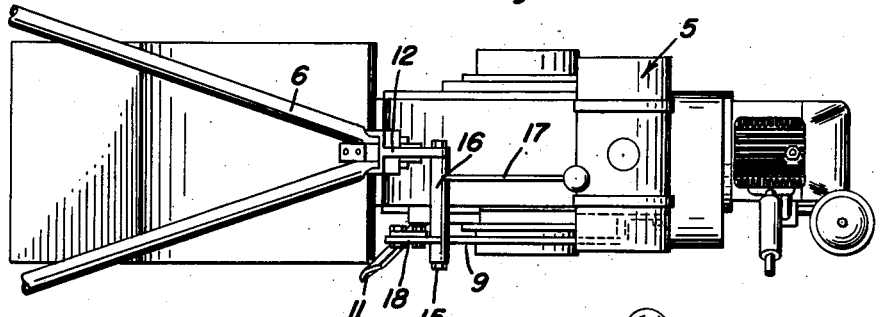
Figure 2 is a top plan view.
Figure 6:
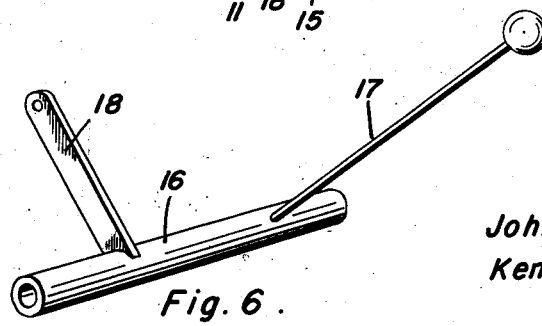
Figure 6 is an enlarged perspective view of the rotary sleeve and lever for raising and lowering the hilling plow.
Figure 4:
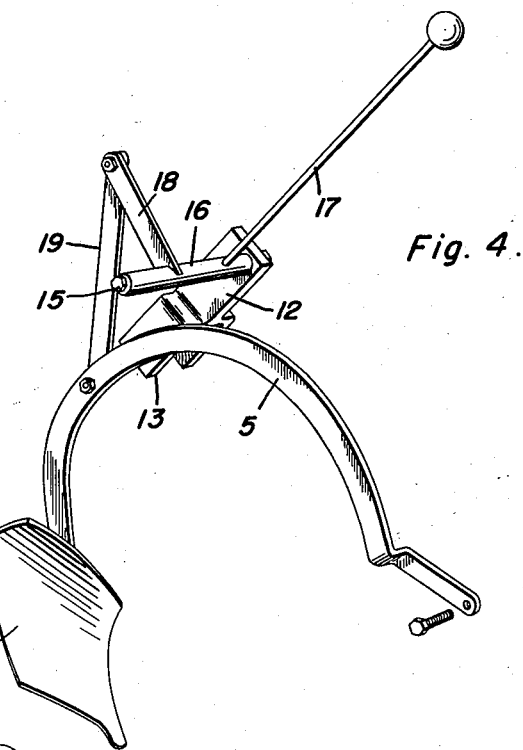
Figure 4 is an enlarged perspective view of the hilling attachment removed from the rotary tiller.
Figure 5:
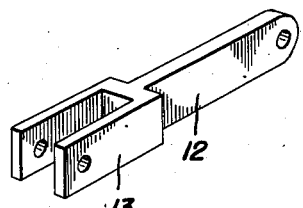
Figure 5 is an enlarged perspective view of the attaching bracket for the hilling attachment.
Figure 3:
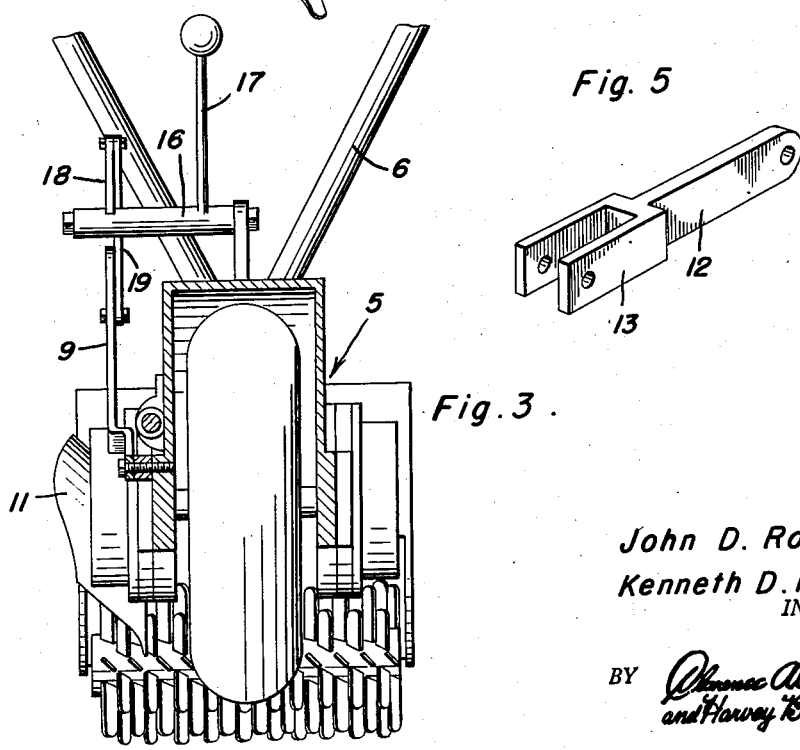
Figure 3 is a transverse sectional view taken substantially on a line 3—3 of Figure 1.

Referring now to the drawings in detail wherein for the purpose of illustration we have disclosed a preferred embodiment of our invention, the numeral 5 designates generally a conventional type of motor operated rotary soil tilling machine of the walking type and which includes a pair of rearwardly diverging trailing handles 6 with front ends suitably secured to the upper rear portion of the tiller in the longitudinal center of the tiller. The tiller is balanced on a single ground wheel 7 and the rotary tilling blades 8 are positioned rearwardly of the wheel.

The hilling attachment comprising the subject matter of the present invention includes an arcuate plow beam 9 which is pivoted at its front end on a part of the tiller machine at a point shown at 10 and at one side of the machine. A hiller blade or plow share 11 embodying a construction similar to a moldboard type plow is secured to the rear end of plow beam 9.

A bracket 12 is formed with a yoke 13 at its rear end straddling the front ends of said handles 6 and secured to the front ends of handles 6 by a bolt and nut 14 to rigidly support the bracket in a forwardly inclined upstanding position.

A pin or stationary shaft 15 is suitably secured to the upper portion of bracket 12 and extends horizontally in a transverse position with respect to the tiller. A sleeve 16 is rockably supported on shaft 15 and is provided with a lever 17 projecting radially from the sleeve and also provided with an arm 18 also projecting radially therefrom and inclined in a rearward direction. A link 19 is pivoted at its upper end to the upper end of arm 18 and is pivoted at its lower end to the plow beam 9 adjacent its rear end.

In the operation of the device, the plow beam 9 is pivoted to one side of the tiller 5 to support the blade or plow 11 forwardly of the rotary tilling blades 18 as shown in Figure 1 of the drawings and the plow is raised and lowered by a rocking movement of sleeve 16 through a forward and rearward swinging movement of lever 17, a rearward movement of the lever swinging the plow 11 downwardly into a position as shown by the dotted lines in Figure 1 of the drawings to hill the soil in advance of the rotary tiller to thus roll the soil between a row of plants and after which the furrow formed by the plow is leveled by the rotary tiller. The soil is thus hilled about the plants without leaving any channels which have a tendency to wash during a rain and danger of erosion is eliminated.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A hilling device for a rotary tilling machine having rearwardly converging trailing handles with front ends secured to the machine in the longitudinal center thereof, said device comprising a beam carrying a plow and having a front end pivoted to one side of the machine for vertical swinging of said beam on said machine alongside the same, a bracket inclining upwardly and forwardly of the front ends of said handles with a rear end yoke thereon straddling said handles at their front ends and fixed thereto, a shaft extending laterally from the front end of said bracket to said side of the machine, a sleeve rockably supported on the shaft, a lever fixed to said sleeve adjacent one end thereof for rocking the sleeve, an arm extending from said sleeve adjacent the other end thereof, and a link pivoted to said arm and beam whereby rocking of said sleeve in a selected direction will swing said beam to raise and lower the plow.

JOHN D. ROTH.
KENNETH D. ROTH.

REFERENCES CITED

The following references are of record in the file of this patent:

UNITED STATES PATENTS

| Number | Name | Date |
|---|---|---|
| 1,832,347 | Adams | Nov. 17, 1931 |
| 1,981,768 | Zieschang | Nov. 20, 1934 |